C. J. KIRK AND G. BRAIN.
MOLD FOR FORMING INSULATORS OR OTHER PORCELAIN OBJECTS.
APPLICATION FILED MAY 9, 1918.

1,304,571.

Patented May 27, 1919.

INVENTOR.
Charles J. Kirk
and George Brain

UNITED STATES PATENT OFFICE.

CHARLES J. KIRK AND GEORGE BRAIN, OF NEW CASTLE, PENNSYLVANIA.

MOLD FOR FORMING INSULATORS OR OTHER PORCELAIN OBJECTS.

1,304,571.

Specification of Letters Patent. Patented May 27, 1919.

Application filed May 9, 1918. Serial No. 233,407.

*To all whom it may concern:*

Be it known that we, CHARLES J. KIRK, a citizen of the United States, and GEORGE BRAIN, a subject of the King of Great Britain, and residents of New Castle, in the county of Lawrence and State of Pennsylvania, have invented a new and useful Improvement in Molds for Forming Insulators or other Porcelain Objects; and we do hereby declare the following to be a full, clear, and exact description thereof.

Our invention relates to a mold for forming insulators or other porcelain objects.

The invention has special application to the manufacture of porcelain insulators for high-tension circuits, of what are known as the umbrella type, in which there are a series of umbrella-shaped projections which act to shed the water so that the parts of the insulator between the projections are protected from rain, and the distance over the surface which leakage currents must traverse between the wire and its support, is greatly increased. Great difficulty has been experienced in the making of these insulators due to the undercut or recessed portions of the projections, and the only practical method of manufacturing same heretofore has been to form a cylinder of porcelain material and before it is dipped and fired the cylinder is mounted in a lathe and the umbrella-shaped projections are cut out by tools to get the desired undercut or overhang; and the article after having been formed in this way, is then dipped and fired in the customary manner.

The object of our invention is to provide a mold for molding insulators or other articles in finished form, so that after they are removed from the molds it is only necessary to dip and fire them to secure the finished articles.

Figure 1:
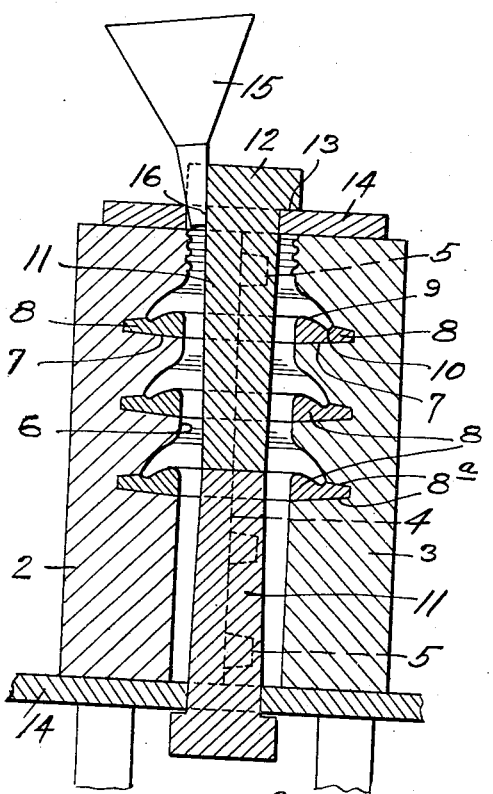
Figure 2:
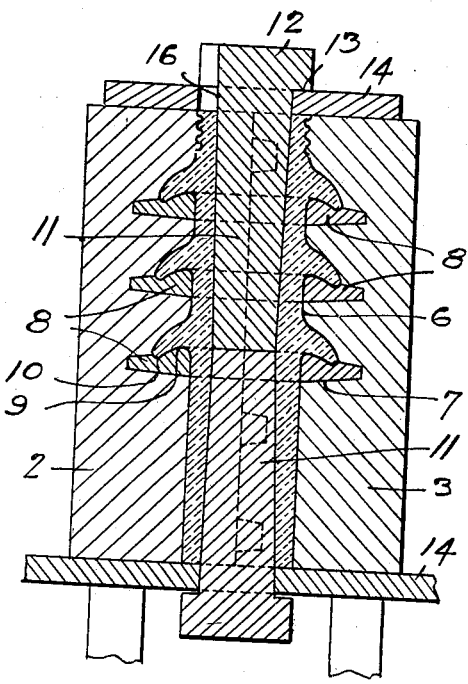
Figure 3:
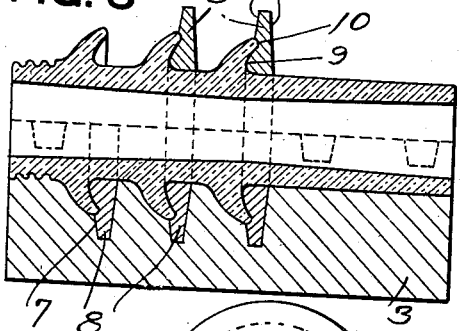
Figure 4:
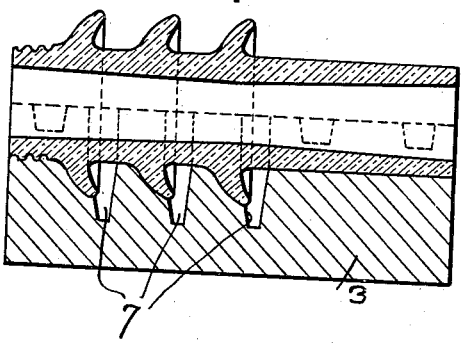
Figure 5:
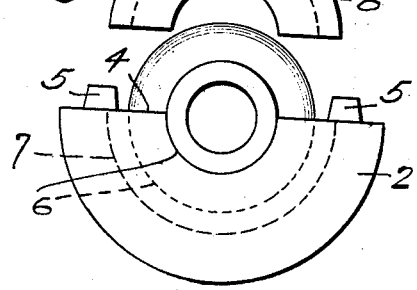

In the accompanying drawing, Figure 1 is a sectional view of a mold ready for pouring; Fig. 2 is a like view after the pouring; Fig. 3 is a view of one of the mold sections with the insulator therein, and one of the core-pieces removed therefrom; Fig. 4 is a view of one mold-section with the insulator lying therein to dry; and Fig. 5 is an end view of one of the mold-sections and one of the core-pieces being withdrawn.

We employ a mold formed of two halves 2 and 3 adapted to be joined along the longitudinal line 4, dowel-pins 5 being provided to register the mold-sections and hold them together. The mold-sections 2 and 3 are made of plaster of Paris, and when they are united they form the matrix 6, each mold-section being provided with the recessed portions 7 to receive the annular plaster of Paris core-pieces 8, which are preferably made in halves. These core-pieces slightly taper toward their outer edges, as at 8ª, and have the convex portions 9 with the annular groove 10. When these core-pieces have been inserted in each of the mold-halves or sections 2 and 3, the sections are brought together and joined along the line 4. Central core-pieces 11 are then inserted to complete the mold, said core-pieces preferably tapering slightly inwardly for convenience of removal, and being provided with the heads 12 to form the shoulders 13 which engage the top and bottom plates 14 through which they are inserted into the mold.

The matrix with the core-pieces ready for molding therein has the appearance shown in Fig. 1. The composition or "slip", as it is termed, in liquid form, from which the insulator is to be formed, is poured through the funnel 15, said funnel being inserted in the opening 16 in the upper core-piece 11, leading into the mold. When the mold is filled, the mold is allowed to stand for several hours until the plaster of Paris of the mold-sections and cores has absorbed the moisture and the article has set or hardened sufficiently. When the hardening has taken place, as above, the core-pieces 11 are withdrawn, the mold is laid horizontally, and one of the mold-halves 2 is removed leaving the core-pieces 7 remaining in the insulator, the convex portions 9 of the core-pieces fitting within the recessed portions 11 of the umbrella or hood of the insulator, as shown in Fig. 3. After this mold-section has been removed, it is apparent that the core-pieces 7 for that section of the mold may then be lifted from the insulator, while lying in the other half of the mold, as shown in Fig. 5. After these core-pieces have been removed, the mold-section 3 is inverted and laid on the mold-section 2, whereupon said section 3 is lifted, leaving the core-pieces of that section on the insulator, and these core-pieces in turn are removed, leaving the insulator molded lying in the mold-section 2, as shown in Fig. 4. The insulator remains in this mold-section until it has hardened sufficiently for finishing. It is then set on drying racks until ready for dipping and firing. The insulator is properly supported during the drying period and the contraction is not interfered with.

It is apparent that our invention is applicable to other forms of articles in which there is an undercut or recessed portion to be formed, the shape of the core-pieces to be varied according to the shape to be given to the object. In an application filed of even date herewith Serial No. 233,408, we have set forth and claimed the process involving the above described steps.

What we claim is:

1. A mold for molding insulators or like objects having an undercut or recessed portion comprising divided mold sections forming a matrix of the desired shape, and a removable core-piece, said core-piece having a convex face to form said undercut portion.

2. A mold for molding insulators or like objects having an under-cut or recessed portion comprising divided mold sections forming when joined a matrix of the desired shape, and a removable divided core-piece, said core-piece having a convex face to form said undercut portion.

3. A mold for molding insulators or like objects having an under-cut or recessed portion comprising longitudinally-divided mold sections joined together to form a matrix of the desired shape with recessed portions, annular divided core-pieces engaging said recessed portions, said core-pieces having convex faces and tapering toward their outer edges.

In testimony whereof, we, the said CHARLES J. KIRK and GEORGE BRAIN have hereunto set our hands.

CHARLES J. KIRK.
GEORGE BRAIN.

Witnesses:
E. E. WHITTAKER,
W. H. GRODEN.